United States Patent [19]
Barker et al.

[11] Patent Number: 5,853,618
[45] Date of Patent: Dec. 29, 1998

[54] FOAM

[75] Inventors: Catherine Louise Barker; Patrick Jean-François Etesse, both of Brussels; Jose Louis Vega, Strombeek-Bever; Jan Hendrik Maria Verbiest, Antwerp, all of Belgium

[73] Assignee: The Procter & Gamble Company, Cincinnati, Ohio

[21] Appl. No.: 983,205

[22] PCT Filed: Jul. 3, 1996

[86] PCT No.: PCT/US96/11273

§ 371 Date: May 5, 1998

§ 102(e) Date: May 5, 1998

[87] PCT Pub. No.: WO97/03176

PCT Pub. Date: Jan. 30, 1997

[30] Foreign Application Priority Data

Jul. 13, 1995 [EP] European Pat. Off. .............. 95870088

[51] Int. Cl.$^6$ ..................................... B01D 19/04
[52] U.S. Cl. .............. 252/321; 8/137; 252/170; 252/179; 252/358; 521/50; 521/82; 521/85; 521/89; 521/97

[58] Field of Search .................. 8/137; 252/321, 252/358, 170, 179; 521/50, 82, 85, 89, 97

[56] References Cited

U.S. PATENT DOCUMENTS 5,002,695 3/1991 Schulz ..................................... 252/321

Primary Examiner—Morton Foelak
Attorney, Agent, or Firm—J. C. Rasser; K. K. Patel; D. M. Goodrich

[57] ABSTRACT

The present invention concerns a foam having a bulk density of less than 250 g/l; the foam having a stability in air of at least 15 seconds (and preferably at least 30 seconds), the stability being defined as the time for the foam to collapse to half its volume when measured in a 111 mm internal diameter and 62 mm internal height glass beaker; wherein the foam has a stability on water at 20° C. of less than 2 hours, the stability on water being defined as the time taken for a 150 ml foam mass on the surface of 450 ml distilled water in a 111 mm internal diameter and 62 mm internal height glass beaker, to collapse to reveal a 2 cm diameter area of the water surface which is substantially free from foam.

8 Claims, No Drawings

FOAM

The present invention is concerned with foam, or mousse, as it is sometimes called.

Foam and mousse are known for use in a wide range of applications including shaving foam, hair mousse, cleaning products including hard surface cleaners for kitchen, bathroom surfaces and windows, carpets, upholstery etc. A review of known applications is given in Cosmetics and Toiletries® magazine, Vol. 110, June 1995, pages 50 to 53: "The Aerosol Mousse" by J. Mufti.

The prior art foams are not in general intended to be dissolved in water in order to produce an aqueous solution, suspension or emulsion.

The present invention aims to provide a foam which can be conveniently dosed and dissolved, suspended or emulsified in water.

SUMMARY OF THE INVENTION

The object of the present invention is achieved by a foam having a bulk density of less than 250 g/l; the foam having a stability in air of at least 15 seconds (and preferably at least 30 seconds), the stability being defined as the time for the foam to collapse to half its volume when measured in a 111 mm internal diameter and 62 mm internal height glass beaker; wherein the foam has a stability on water at 20° C. of less than 2 hours, the stability on water being defined as the time taken for a 150 ml foam mass on the surface of 450 ml distilled water in a 111 mm internal diameter and 62 mm internal height glass beaker, to collapse to reveal a 2 cm diameter area of the water surface which is substantially free from foam.

It is preferred that the foam has a stability on water at 20° C. of less than 1 hour, preferably less than 30 minutes, and more preferably less than 10 minutes.

For cleaning applications it is further preferred that the foam comprises at least 5%, and more preferably at least 18% by weight of surfactant.

Further aspects of the present invention are preparing a wash liquor by dissolving, suspending or emulsifying the foam described above in water, and using the wash liquor to clean textile fabrics.

DETAILED DESCRIPTION OF THE INVENTION

Foam is a coarse dispersion of gas in a relatively small amount of liquid. The foams of the present invention are a continuous liquid phase comprising a composition, and a dispersed phase comprising a gas. Typically, the gas "bubbles" of the dispersed phase can vary in size from 50 micrometers to several millimeters.

In general, the quality of the foam is determined by assessing various foam quality attributes, such as: 1) the appearance of the foam as it is determined by the uniformity of the bubble size distribution, as well as by the actual bubble sizes, wherein small and uniformly sized bubbles are generally preferred; 2) the thickness of the foam as it is determined by the apparent foam viscosity, wherein a greater apparent foam viscosity is generally preferred; 3) the density of the foam which is preferably less than 250 g/l, more preferably less than 150 g/l, and most preferably less than 100 g/l; 4) the drainage of the liquid from the foam in air upon standing on a solid surface, wherein slow of drainage of the liquid is generally preferred; and 5) the rate at which the foam composition is dissolved, suspended or emulsified in water. For the purposes of the present invention a rapid rate of dissolving, suspending or emulsifying the foam composition in water is an essential feature.

Foam stabilising agents may also be employed in the compositions of the present invention to increase foam stability in air. Especially preferred are alyphatic alcohols such as straight chain saturated alcohols of 12 to 18 carbon atoms e.g. cetyl alcohol, stearyl alcohol, myristyl alcohol and mixtures thereof. Polymers including polyvinylpyrrolidone, polyvinyl alcohol, polyacrylamide, polypeptides, polysaccharides, cellulose derivatives; and also natural and synthetic gums and resins such as guar gum, xantham gum, carageenan, sodium alginate and caseinate may also be used in the present invention.

In one aspect of the present invention, the foam is dispensed from a package which comprises a sealed container, such as an essentially cylindrical bottle, having a dispensing means such as a valve or valve/nozzle assembly. The container contains the composition and propellant gas. Suitable containers may be made from any material, especially aluminium, tin-plate, plastics including PET, OPP, PE or polyamide and including mixtures, laminates or other combinations of these. Foam is dispensed when the dispensing means is activated and the detergent is released together with the propellant gas. The propellant gas expands to form many "bubbles" within the composition thereby creating the foam.

The propellant gas of this aspect of the present invention comprises carbon dioxide, or nitrous oxide (especially $N_2O$), fluorocarbons (e.g. CFC, HCFC and HFC), alkanes (e.g. propane, butane, pentane, hexane) or mixtures thereof. Most preferred is carbon dioxide. A particular advantage of carbon dioxide is that is has been found to considerably increase the rate at which the foam is dissolved in water. That is to say that the stability of the foam on water is decreased.

Various ways to pressurise the propellant gas are known in the art. For example the gas may be pressurised at the time of packing. The product may be physically separated from a compressed gas by a membrane such as rubber under tension. Alternatively a means for pressurising the gas subsequently by mechanical action may be provided (so-called "pump and spray" systems).

Various apparatus for delivering foams are described in U.S. Pat. No. 5,364,031 issued on 15th Nov. 1994 entitled "Foam Dispensing Nozzles and Dispensers Employing Said Nozzles".

Any nozzle or nozzle/valve assembly which provides a means for releasing the mixture of detergent ingredients from the container and provides a foam is suitable for use in the present invention. The Precision Valve Company (Valve Précision in France) supplies a range of nozzle assemblies for various applications including shaving foams and carpet cleaners under various trade names including City®, Montego®, Power Jet®, Vulcan® and Visco®. Nozzles which disperse the foam both horizontally and vertically (when the container is held upright) are available. Metering nozzles which dispense a predetermined amount of foam are also available and useful in the present invention. Metering valves are disclosed in WO9108965 (Precision Valve Co) and EP-A 616953 (3M Co). In order for the apparatus to be effective in the method of the present invention it should deliver the foam at a rate of at least 3 g per second of foam from the sealed container, more preferably at a rate of at least 10 g per second.

Test Methods

A. Foam Density

A glass beaker, 62 mm internal height, 111 mm internal diameter is degreased with a standard soap solution and well rinsed with distilled water. The beaker is filled with foam until overflowing, excess foam being immediately scraped off using a straight edge wiped across the top edge of the beaker. The difference in weight of the full beaker (W2) minus the empty beaker (W1) is the weight of foam. The volume of the beaker (V) is known. Foam density is calculated by (W2−W1)/V.

B. Foam Stability in Air

A glass beaker, 62 mm internal height, 111 mm internal diameter is degreased with a standard soap solution and well rinsed with distilled water. The beaker is filled with foam until overflowing, excess foam being immediately scraped off using a straight edge wiped across the top edge of the beaker.
The time taken for the foam to collapse to half the total volume of the glass beaker is an indication of the foam stability in air. In this test the time taken for the foam to collapse to half the height of the glass beaker is measured and recorded.

C. Foam Stability on Water

A glass beaker, 62 mm internal height, 111 mm internal diameter is degreased with a standard soap solution and well rinsed with distilled water. The beaker is filled with 450 ml of distilled water at 20° C. The beaker is filled with foam until overflowing, excess foam being immediately scraped off using a straight edge wiped across the top edge of the beaker. The time taken for the foam to collapse until an area of the water surface, at least 2 cm in diameter, is visible and is substantially free of foam, is an indication of the foam stability on water. In this test the time taken for an area of the water surface, at least 2 cm in diameter, to be visible and substantailly free of foam is measured and recorded.

EXAMPLES

Liquid laundry compositions were prepared according to the compositions in Table 1. Then each composition was packed into metal containers, each container having a nominal capacity of 405 cubic centimeters. The cans were then filled with the corresponding propellants at room temperature.

The cans filled with liquified propellants (mixtures of propane (about 25%), isobutane (about 70%) and n-butane (to balance)—such that the vapour pressure at 20° C. is 3.2 bar +/−0.1, generally referred to as "butane 3.2 bars" [P/B]; or HFC 134a) were filled with 300 ml of the liquid composition and 10% by weight of the liquid with the propellant. The cans filled with the compressed gas, carbon dioxide, were filled with 250 ml of liquid detergent and then were pressurised with carbon dioxide while shaking, until it equilibrates to a can pressure of about 10 bars of carbon dioxide at about 20° C.

All the cans are fitted with a 3×1.0 mm standard valve (Code No. 045380 supplied by Valve Precision), without a dip tube and a straight whipped cream nozzle. In order to expel the foam out of the can, the can must be in an inverted position.

The cans were allowed to rest for a day at room temperature (about 20° C.) before the testing for the foam characteristics is performed. Immediately before the testing is done, the cans are thoroughly shaken by hand to ensure homogeneity of the components inside the can. All foam densities and stabilities were measured based upon the first discharge of foam from the filled aerosol container.

The results of the methods described above are shown in Table 2.

TABLE 1

Liquid Detergent Compositions

| | 1 | 2 | 3 | 4 | 5 | 6 | 7 |
|---|---|---|---|---|---|---|---|
| Alkyl sulphate | 7.44 | 7.44 | 7.44 | 16.75 | | | |
| Alkyl ethoxy sulphate | 6.38 | 6.38 | 6.38 | 2.00 | 2.00 | 2.00 | 2.00 |
| LAS | | | | | 12.20 | 12.20 | 12.20 |
| Nonionic C12/C15 E7 | 10.62 | 10.62 | 10.62 | 5.63 | 6.00 | 6.00 | 6.00 |
| NMG | 4.06 | 4.06 | 4.06 | 5.50 | | | |
| Fatty acid | 8.79 | 8.79 | 8.79 | 10.62 | | | |
| Citric acid | 0.87 | 0.87 | 0.87 | 1.00 | | | |
| Soap | | | | | 1.20 | 1.20 | 1.20 |
| Propane diol | 9.65 | 9.65 | 9.65 | 10.68 | | | |
| Ethanol | 0.68 | 0.68 | 0.68 | 1.37 | | | |
| Monoethanolamine | 7.52 | 7.52 | 7.52 | 7.65 | | | |
| NaOH | | | | 1.17 | | | |
| Ethoxylated TEP | 0.31 | 0.31 | 0.31 | 0.22 | | | |
| Phosphonate | 1.34 | 1.34 | 1.34 | 0.94 | | | |
| Soil release polymer | 0.238 | 0.238 | 0.238 | 0.15 | | | |
| PVNO | 0.24 | 0.24 | 0.24 | | | | |
| Protease | 0.200 | 0.200 | 0.200 | 0.480 | | | |
| Lipolase | 0.095 | 0.095 | 0.095 | 0.067 | | | |
| Amylase | 0.190 | 0.190 | 0.190 | 0.130 | | | |
| Cellulase | 0.118 | 0.118 | 0.118 | 0.028 | | | |
| CaCl2 | 0.020 | 0.020 | 0.020 | 0.020 | | | |
| Boric acid | 4.500 | 4.500 | 4.500 | 3.250 | | | |
| Silicone Oil | | | | 0.18 | | | |
| Dispersant | | | | 0.02 | | | |
| Silica | | | | 0.013 | | | |
| PTMS | 0.030 | 0.030 | 0.030 | 0.020 | | | |

TABLE 1-continued

Liquid Detergent Compositions

|  | 1 | 2 | 3 | 4 | 5 | 6 | 7 |
| --- | --- | --- | --- | --- | --- | --- | --- |
| FWA |  |  |  | 0.147 |  |  |  |
| Dye |  |  |  | 0.001 | 0.001 | 0.001 | 0.001 |
| Perfume | 1.200 | 1.200 | 1.200 | 0.530 | 0.500 | 0.500 | 0.500 |
| PEG 200 | 30.00 | 25.00 | 20.00 |  |  | 1.50 | 10.00 |
| Water | 5.51 | 10.51 | 15.51 | 31.43 | 78.10 | 76.60 | 68.10 |
| Total | 100 | 100 | 100 | 100 | 100 | 100 | 100 |

LAS is linear alkyl benzene sulphonate.

Nonionic C12/C15 E7 is C12/C15 alcohol ethoxylated with an average of 7 ethoxy groups per mole.

NMG is C12/C14 N-methyl glucamide.

Ethoxylated TEP is ethoxylated tetraethylenpentamine.

PVNO is polyvinylpyridin-N-oxide.

PTMS is propyl trimethoxysilane.

FWA is fabric whitening agent (or optical brightener).

PEG200 is polyethylene glycol with an average molecular weight of 200.

Enzyme activities are: protease, 34 g/l; lipolase, 209 KLU/g; amylase, 300 KNU/g; cellulase, 5000 CEVU/g, all supplied by Novo

TABLE 2

Foam Characteristics

|  | I | II | III | IV | V |
| --- | --- | --- | --- | --- | --- |
| Composition | 1 | 1 | 1 | 2 | 2 |
| Propellant | CO2 | HFC | P/B | CO2 | P/B |
| Foam Density | 78 | 52 | 30 | 84 | 28 |
| Foam Stability in Air (mins) | 8 | 7 | 2.75 | 11 | 8 |
| Foam Stability on Water (mins) | 2.75 | 45 | 75 | 35 | 77 |

|  | VI | VII | VIII | IX | X | XI |
| --- | --- | --- | --- | --- | --- | --- |
| Composition | 3 | 3 | 4 | 4 | 5 | 5 |
| Propellant | CO2 P/B | P/B | CO2 | P/B | CO2 |  |
| Foam Density | 96 | 28 | 116 | 28 | 138 | 22 |
| Foam Stability in Air (mins) | 11 >30 | 9.5 | 0.25 | 0.9 | 15 |  |
| Foam Stability on Water (mins) | 3.8 | 78 | 4.3 | 59 | 5 | 39 |

What is claimed is:

1. A foam having a bulk density of less than 250 g/l, the foam having a stability in air of at least 15 seconds, the stability being defined as the time for the foam to collapse to half its volume when measured in a glass beaker having a 111 mm internal diameter and 62 mm internal height, wherein the foam has a stability on water at 20° C. of less than 2 hours, the stability on water being defined as the time taken for a 150 ml foam mass on the surface of 450 ml distilled water in a glass beaker having a 111 mm internal diameter and 62 mm internal height, to collapse to reveal a 2 cm diameter area of the water surface which is substantially free from foam.

2. A foam according to claim 1 wherein the foam has a stability on water at 20° C. of less than 1 hour.

3. A foam according to claim 1, wherein the foam comprises at least 5% by weight of surfactant.

4. A foam according to claim 3, wherein the foam comprises at least 18% by weight of surfactant.

5. A method of preparing a wash liquor comprising the step of dissolving, suspending, emulsifying or mixtures of these, the foam of claim 4 in water.

6. A method of washing textile fabrics comprising the step of immersing the textile fabrics in the wash liquor of claim 5.

7. A foam according to claim 2 wherein the foam has a stability on water at 20° of less than 30 minutes.

8. A foam according to claim 7 wherein the foam has a stability on water at 20° of less than 10 minutes.

* * * * *